(No Model.)

G. A. HAGEMANN.
Centrifugal Machine.

No. 237,523. Patented Feb. 8, 1881.

Witnesses.
Geo Binkenburg
Jos. T. Power

Gustav Adolph Hagemann.
Inventor,
by Louis Bagger & Co.
Attorneys.

N. PETERS, PHOTO-LITHOGRAPHER, WASHINGTON, D. C.

UNITED STATES PATENT OFFICE.

GUSTAV A. HAGEMANN, OF COPENHAGEN, DENMARK.

CENTRIFUGAL MACHINE.

SPECIFICATION forming part of Letters Patent No. 237,523, dated February 8, 1881.

Application filed July 26, 1880. (No model.)

*To all whom it may concern:*

Be it known that I, GUSTAV ADOLPH HAGEMANN, a subject of His Majesty the King of Denmark, residing in the city of Copenhagen, in the Kingdom of Denmark, have invented a new and useful Improvement in Centrifugal Machines; and I do hereby declare that the following is a full, clear, and exact description of the invention, which will enable others skilled in the art to which it appertains to make and use the same, reference being had to the accompanying drawings, which form a part of this specification, and in which—

Figure 1:
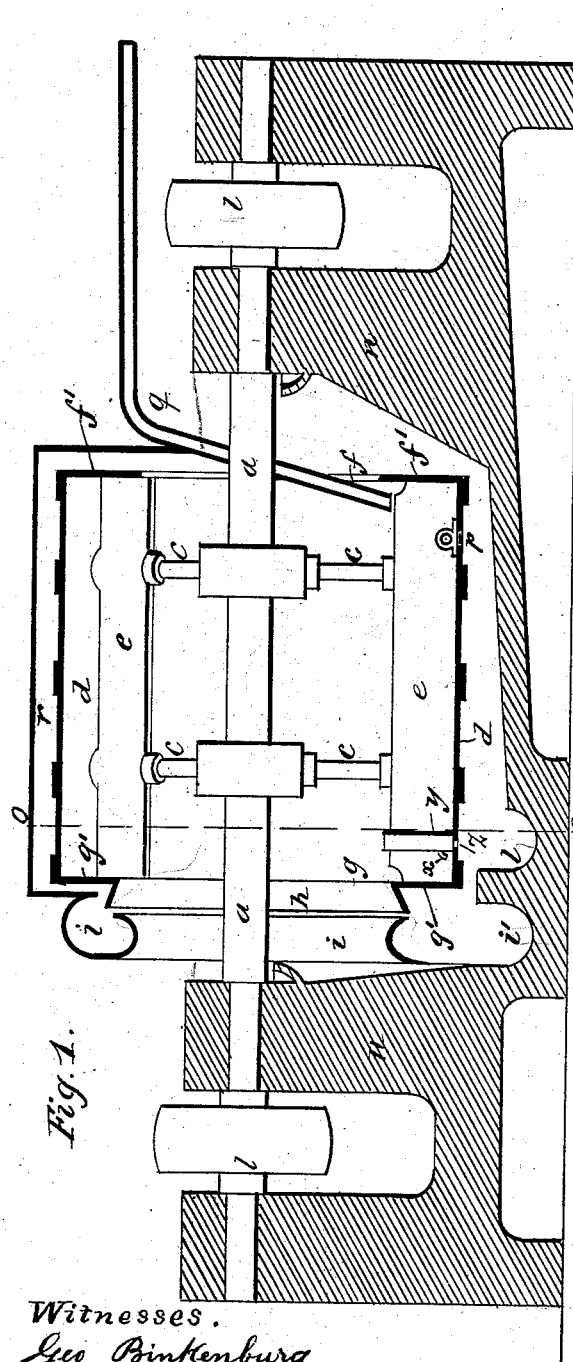
Figure 2:
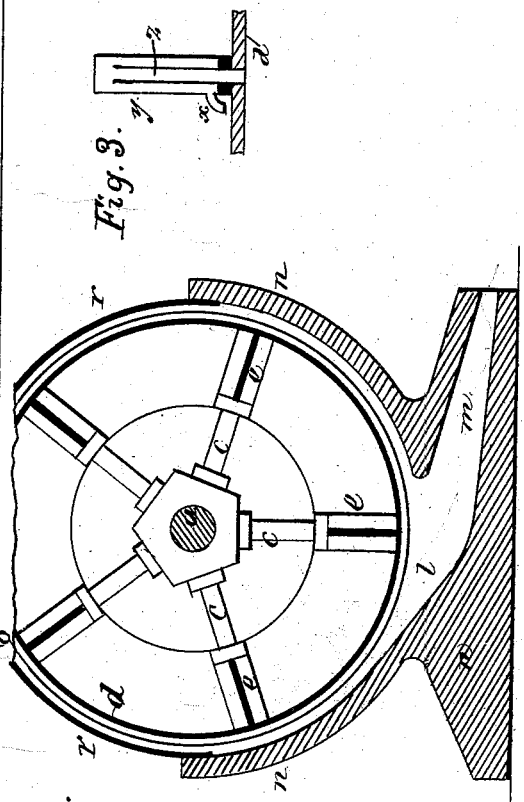
Figure 3:
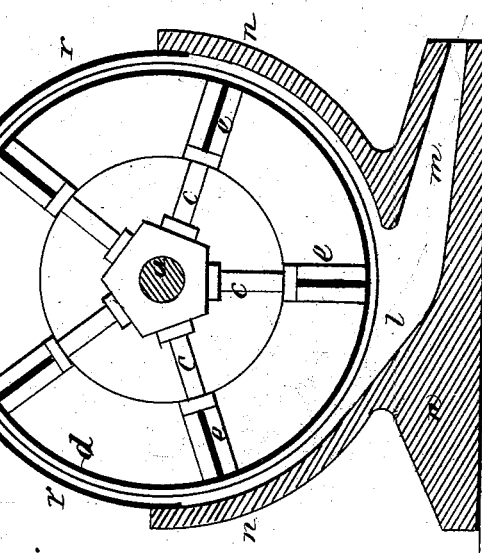

Figure 1 is a longitudinal vertical section. Fig. 2 is a transverse section through line $o\,o$, Fig. 1; and Fig. 3 is a detail view, in vertical section, of one of the discharge-tubes with its inclosing-jacket, as hereinafter described.

Similar letters of reference indicate corresponding parts in all the figures.

My invention relates to centrifugal machines for creaming milk or for other purposes—as, for example, where it is desired to separate component parts of a liquid or fluid, which said component parts are of different specific gravity, or where the object is to separate a liquid or fluid from sediment the specific gravity of which is but slightly in excess of that of the liquid in which it is contained.

I do not claim as my invention, broadly, the process of creaming milk and skimming off the cream by the action of centrifugal force; nor do I claim the process of creaming milk by centrifugal force and feeding in skimmed milk, new milk, or milk and water to drive off the cream and milk; but my improvement relates to machines adapted for this and other purposes, having for its object to facilitate the operation of segregating the component parts of the liquid or fluid operated upon.

Heretofore vertical machines or centrifugal vessels mounted upon a vertical rotating axle have been used for this purpose; but experience has shown that, notwithstanding (perhaps) a reduced amount of friction in operating the machine, the saving in power thus supposed to be effected is more than counterbalanced by the necessary complication of parts of that class of machines, by their uncertainty of motion in starting and stopping, and by the faulty and expensive means of supports or bearings heretofore suggested and patented for machines of this class.

Hence my improvement consists in the construction and arrangement of parts of a horizontally-operating machine supported upon and operated by a horizontal axle resting in proper bearings, which receives the liquid or fluid the component parts of which are to be segregated at one end and discharges the segregated component parts of the same at the opposite side or end, substantially as hereinafter more fully set forth.

In the annexed drawings, illustrative of my invention, the letter $n$ represents the bed or frame of my machine, which consists, essentially, of a hollow cylinder, $d$, braced by iron bands or hoops, which is mounted upon a horizontal shaft, $a$, having its bearings in the bed or supporting-frame $n$. This cylinder $d_i$ has annular end flanges, $f'\,g'$, projecting inwardly toward the shaft or axle, so as to leave a central opening, $f\,g$, at each end, as clearly shown in Fig. 1 of the drawings. Shaft $a$ is rotated by one or more pulleys, $l$, by a steam-engine, or any other suitable power.

Radial arms $c\,c_i$ connect axle or shaft $a_i$ with the inner circumference of the cylinder, and ribs or flanges $e\,e_i$ are placed at suitable intervals along the inside (by preference braced by or secured to the radial arms $c\,c$) of the cylinder, for the purpose of carrying the contained liquids or fluids around with it.

Cylinder $d_i$ rotates within a jacket or casing, one half of which is formed by frame $n$, or by a suitably-constructed casing forming part thereof, and the upper half by a semi-cylindrical sheet-metal box, $r$, which has a correspondingly-shaped chamber, $i$, at one end. The contiguous open end of the rotary cylinder $d_i$ has a flaring collar, $h$, which opens up into chamber $i_i$ and its continuation $i'_i$ in the lower part or frame of the machine. The opposite open end of the cylinder receives a feed-pipe, $q$, through its annular aperture $f$, through which the milk or other fluid to be operated upon is fed to the machine. Cylinder $d$, near its rim or end opposite to the feed-pipe $q$, is perforated, and an inwardly-projecting tube, $z$, (see Fig. 3,) is screwed into the aperture or perforation. This tube, which is open at both ends, is inserted into a tubular jacket, $y$, which is closed at its upper end, but has a spout or inlet, $x$, at its lower end, in close proximity to the inner wall of the cylinder. The lower casing or frame, $n$, has a gutter or conduit, $l$, opposite that part or end of the cylinder which is provided with the jacketed tube $z$, which has an outlet, $m$, leading to a suitably-located vessel or reservoir.

From the foregoing description, taken in connection with the drawings, the operation of my invention will readily be understood. The sweet milk or other fluid to be operated upon is, as above stated, fed to the rotating cylinder $d$, through pipe $q$, at its open end, $f$. In its passage to the opposite end, $g$, the lighter parts of the fluid (the cream) will come up toward the axle, while the heavier parts (the skim-milk) will be impelled by the centrifugal force close up against the inner wall of the cylinder, entering the tubular jacket $y$, through its spout $x$, and escaping out of the cylinder through the pipe $z$, inserted into the jacket. The cream, on the other hand, escapes out over the collar $h$ into the surrounding annular chamber $i$ and its gutter $i'$, while the skim-milk, which is discharged through pipe $z$, is received in the hollow casing $r$, which surrounds the cylinder, and collected in the gutter $l$, from which it is conducted through its outlet $m$ to the vessel arranged for its reception. The remaining contents may be drawn off through a hole in the wall of the cylinder, which, when the machine is in operation, is closed by a screw plug or stopper, $p$.

It is obvious that the rotating vessel $d$ need not be a cylinder; but, if desired, it may be cone-shaped, tapering either way—a construction that in the treatment of some liquids will be found to possess certain advantages. It is also obvious that there may be several outlets, $z$, to expedite the discharge of the milk, which is, of course, continuous as long as fluid is being fed to the machine through pipe $q$.

Having thus described my invention, I claim and desire to secure by Letters Patent of the United States—

1. The horizontally-mounted centrifugal vessel $d$, provided with an inlet, $f$, at one end, with radial wings or flanges $e$ $e$, and with discharge-pipes $z$, inserted into tubular jackets $y$, having inlets $x$, substantially as shown and set forth.

2. The combination, with the horizontally-mounted centrifugal vessel $d$, having outlets $z$ $g$ and annular collar $h$, of the jacket or casing $r$ $n$, having annular chamber $i$ and gutters $i'$ $l$, substantially as set forth.

3. The centrifugal machine for creaming milk or for other purposes, composed of the horizontally-mounted centrifugal vessel $d$, having radial wings $e$ $e$, central end apertures, $f$ $g$, and jacketed discharge-pipes $y$ $z$, feed-pipe $q$, and jacket or casing $r$ $n$, having annular chamber $i$ and gutters $i'$ $l$, constructed and combined substantially as and for the purpose herein shown and specified.

In testimony whereof I have signed my name to the foregoing specification in the presence of two subscribing witnesses.

GUSTAV ADOLPH HAGEMANN.

Witnesses:
   FR. WOLFF,
   V. SCHWANER.